UNITED STATES PATENT OFFICE 2,216,561

CROTYL 1-METHYL-BUTYL THIOBARBITURIC COMPOUND AND METHOD OF PRODUCING IT

Horace A. Shonle and Wilbur J. Doran, Indianapolis, Ind., assignors to Eli Lilly and Company, Indianapolis, Ind., a corporation of Indiana No Drawing. Application October 11, 1939, Serial No. 299,010

3 Claims. (Cl. 260—260)

Our present invention is directed to a new anesthetic, sedative, and sleep-producing compound, crotyl 1-methyl-butyl thiobarbituric acid and its salts, and to the method of producing them.

Salts of this new crotyl 1-methyl-butyl thiobarbituric acid are found to have surprising properties. On parenteral administration they are definitely sedative and anesthetic in their physiological action, and have definite analgesic properties. The minimum anesthetic dose of the sodium salt, for instance, is remarkably low; for that sodium salt is effective in doses of 30 mg. per kg. of body weight to produce a complete anesthesia in rabbits on intravenous administration. The onset of action is rapid; the sodium salt usually takes effect in rabbits in less than a minute. The duration of action is unusually short; for a rabbit which has been put into complete anesthesia by the sodium salt ordinarily comes out of the anesthesia completely within about thirty minutes. In addition, the anesthesia produced is complete and quiet. This is noteworthy in view of the fact that crotyl alkyl thiobarbituric acids often produce convulsions or else are devoid of anesthetic action, or both; for the crotyl allyl and the dicrotyl compounds are inactive although they produce no convulsions, the crotyl normal-butyl and the crotyl 3-methyl-butyl compounds are inactive and produce convulsions, and the crotyl 2-methyl-propyl compound has an action which is mixed convulsive and anesthetic. In view of the relation between the actions of these various compounds, it is apparent that it was impossible to predict the therapeutic response and therefore the utility and availability of the new crotyl 1-methyl-butyl thiobarbituric acid and its salts which are the subject of the present application.

Our new crotyl 1-methyl-butyl thiobarbituric acid and its salts may be represented by the following formula:

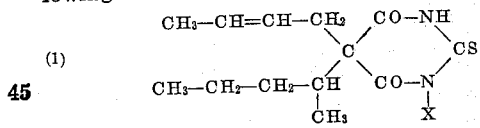

in which X represents a member of the class consisting of hydrogen (if the compound is an acid), and (if the compound is a salt) an alkali metal, such as sodium, an equivalent of an alkaline-earth metal, such as calcium, ammonium, monoalkyl ammonium, such as —NH$_3$CH$_3$, dialkyl ammonium, such as —NH$_2$(C$_2$H$_5$)$_2$, and alkanol ammonium, such as —NH$_3$CH$_2$CH$_2$OH.

In preparing our new crotyl 1-methyl-butyl thiobarbituric acid, it is important that the crotyl halide (preferably bromide or chloride) used in preparing the crotyl 1-methyl-butyl ethylmalonate or the croytl 1-methyl-butyl ethylcyanacetate from which the desired crotyl 1-methyl-butyl thiobarbituric acid is obtained, be substantially free from any isomer, particularly from the 1-methyl-allyl halide into which the crotyl halide partially isomerizes on standing to produce an equilibrium mixture. Therefore, it is important that there be a separation of such an equilibrium mixture of halides to obtain therefrom substantially isomer-free the desired crotyl halide (chloride or bromide) immediately before preparing the crotyl 1-methyl-butyl ethylmalonate or ethylcyanacetate; which separation of isomers may be done by known methods. (See Winstein and Young, Jour. Am. Chem. Soc., vol. 58, page 104, 1936; Kharasch, Kritchevsky, and Mayo, Jour. Org. Chem., vol. 2, page 489, 1937-8.)

In preparing our desired crotyl 1-methyl-butyl thiobarbituric acid, we may proceed by either the malonic-ester method or the cyanacetic-ester method; but we prefer the malonic-ester method.

Malonic-ester method

To make the disubstituted crotyl 1-methyl-butyl ethylmalonate, we condense a crotyl halide with 1-methyl-butyl ethylmalonate, or a 1-methyl-butyl halide with mono-crotyl ethylmalonate, in the presence of sodium ethylate, in the manner customary for making disubstituted malonic esters.

*Example*—One mol. of sodium is dissolved in from 10 to 12 times its weight of absolute alcohol, under a reflux condenser. One mol. of 1-methyl-butyl ethylmalonate is then added. Part of the alcohol that was used may then be removed, as by vacuum distillation, and then about 1.1 mols. of crotyl bromide (or crotyl chloride) are gradually added. The crotyl bromide (or crotyl chloride) used should be substantially isomer-free, as has already been pointed out. The mixture is refluxed for some hours, desirably until it no longer shows an alkaline reaction to moist litmus paper. Most of the alcohol remaining, whether or not some had previously been removed, is now removed by vacuum distillation, leaving an oily residue. Water is added to this residue to dissolve out the sodium bromide (or chloride) present in it; and the oily layer, which contains the desired crotyl 1-methyl-butyl ethylmalonate, is separated and dried. This crude crotyl 1-methyl-butyl ethylmalonate is purified by fractional distillation in vacuo; and when purified is found to boil at 125°–130° C., uncorrected, at about 4 mm. pressure. It is a substantially colorless liquid, and is represented by the following formula:

(2) 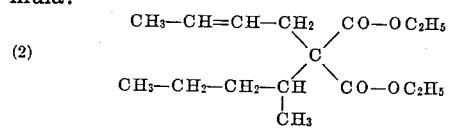

As has already been indicated, instead of using 1-methyl-butyl ethylmalonate and crotyl bromide (or crotyl chloride) we may use mono-crotyl ethylmalonate and 1-methyl-butyl bromide (or chloride). In that case, however, the crotyl ethylmalonate should be substantially isomer-free; for which purpose care should be taken in making it.

So far as we know, this crotyl ethylmalonate is a new substance with us. It is made by condensing 1 mol. of ethylmalonate with about 1.1 mols. of crotyl bromide (or chloride) in the presence of a solution of 1 mol. of sodium ethylate in absolute alcohol. The crotyl bromide (or chloride) should be substantially isomer-free. The mixture is refluxed for some hours, desirably until it no longer shows an alkaline reaction to moist litmus paper. The alcohol is now removed by vacuum distillation, leaving an oily residue. Water is added to this residue to dissolve out the sodium bromide (or chloride) present in it; and the oily layer, which contains the desired crotyl ethylmalonate, is separated and dried. The crude crotyl ethylmalonate is purified by fractional distillation in vacuo; and when purified is found to boil at about 121° C., at 13 mm. pressure. It is a substantially colorless liquid, and may be represented by the folowing formula:

(3) 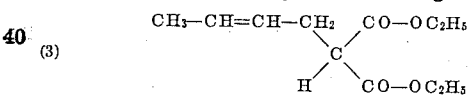

From the crotyl 1-methyl-butyl ethylmalonate, prepared by either process outlined above, we may prepare crotyl 1-methyl-butyl thiobarbituric acid as follows:

Three mols. of sodium are dissolved in 10 to 12 times its weight of absolute alcohol under a reflux condenser. To these are added about 1.6 mols. of thiourea and 1 mol. of crotyl 1-methyl-butyl ethylmalonate. The mixture is gently refluxed for about 15 to 20 hours, after which most of the alcohol is removed by vacuum distillation. The residue is dissolved in water, and a sufficient amount of dilute acid, such as hydrochloric acid, is added to completely throw out of solution the crotyl 1-methyl-butyl thiobarbituric acid which has been formed. This crotyl 1-methyl-butyl thiobarbituric acid comes out of solution in the form of an oil, which does not solidify on standing at ordinary temperatures. The oil so obtained is separated, as by being shaken out with ether; and the ether solution so obtained is treated with dilute aqueous sodium hydroxide solution, by which the thiobarbituric acid in the ether solution is converted to the sodium salt thereof in water solution, which is suitably separated from the ether. We now convert the salt in the aqueous solution to the acid by acidification, as with hydrochloric acid, by which we obtain the desired thiobarbituric acid as an oil. In doing this, however, we prefer to include a purification step; which consists in adding the dilute hydrochloric acid just to the point of producing a slight turbidity, then adding decolorizing carbon and filtering to obtain a clear solution, and then adding the remaining necessary amount of hydrochloric acid to throw down the desired thiobarbituric acid, in the form of an oily liquid.

This liquid, which is crotyl 1-methyl-butyl thiobarbituric acid, is a clear liquid, with a slight straw color. It is insoluble in water, and readily soluble in alcohol and ether; and is bitter tasting. Its formula is:

(4) 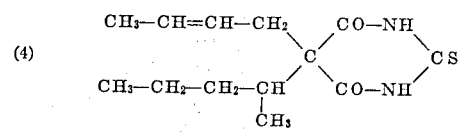

*Cyanacetic-ester method*

When ethylcyanacetate is used instead of ethyl-malonate in the preparation of crotyl 1-methyl-butyl thiobarbituric acid, purified crotyl chloride (or bromide) may be reacted with 1-methyl-butyl ethylcyanacetate, or 1-methyl-butyl bromide may be reacted with crotyl ethylcyanacetate. In using the latter procedure 1 mol. of sodium is dissolved in 10 to 12 times its weight of absolute alcohol under a reflux condenser. 1 mol. of ethylcyanacetate is then added. The sodium ethylcyanacetate separates out as a solid at this stage. Then about 1.1 mols. of purified crotyl chloride (or bromide) are added and the mixture is refluxed for about 15 hours. The alcohol is removed by vacuum distillation, leaving an oily residue. Water is added to this residue to dissolve out the sodium chloride present in it; and the oily layer, which contains the desired crotyl ethylcyanacetate, is separated and dried. This crude crotyl ethylcyanacetate is purified by fractional distillation in vacuo, and when so purified is found to boil at 97°–105° C., at about 5 mm. pressure. It is a substantially colorless liquid and is represented by the following formula:

(5) 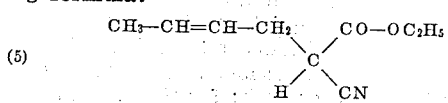

In a manner similar to the above procedure, crotyl 1-methyl-butyl ethylcyanacetate may be prepared from 1-methyl-butyl bromide (or chloride) and crotyl ethylcyanacetate.

The crotyl 1-methyl-butyl ethylcyanacetate may be purified by fractional distillation. It is a substantially colorless liquid, and is represented by the following formula:

(6) 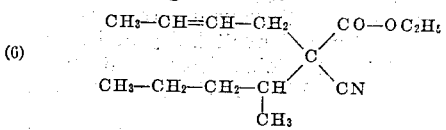

From the disubstituted crotyl 1-methyl-butyl ethyl-cyanacetate, prepared by either procedure, we may make crotyl 1-methyl-butyl thiobarbituric acid, as follows:

Three mols. of sodium are dissolved in 10 to 12 times its weight of absolute alcohol under a reflux condenser. To these are added about 1.6 mols. of thiourea and 1 mol. of crotyl 1-methyl-butyl ethylcyanacetate. The mixture is gently refluxed for about 15 or 20 hours, after which most of the alcohol is removed by vacuum distillation. The residue is dissolved in water, and sufficient dilute acid, such as hydrochloric acid, is added to make the solution barely acid to litmus paper. Excess acid is undesirable, because it will dissolve the crotyl 1-methyl-butyl imino thiobarbituric acid which has been formed; whereas if the solution is made just barely acid that crotyl 1-methyl-butyl imino thiobarbituric acid separates out as a solid. This solid so obtained is separated, as by filtration; is then dried, and is then purified by recrystallization as from dilute alcohol.

This crotyl 1-methyl-butyl imino thiobarbituric acid is represented by the following formula:

(7) 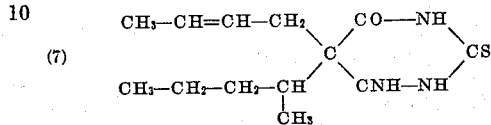

On boiling with aqueous hydrochloric acid or aqueous alcoholic hydrochloric acid the crotyl 1-methyl-butyl imino thiobarbituric acid is converted by hydrolysis into crotyl 1-methyl-butyl thiobarbituric acid.

Thiobarbiturates may readily be obtained from this crotyl 1-methyl-butyl thiobarbituric acid. These thiobarbiturates are represented by formula 1 above, with X representing an alkali metal, an equivalent of an alkaline-earth metal, ammonium, mono-alkyl ammonium, di-alkyl ammonium, or alkanol ammonium. These thiobarbiturates may be obtained by the reaction of the crotyl 1-methyl-butyl thiobarbituric acid, in a suitable solvent, with either the hydroxide or the ethylate of the desired inorganic base, or with ammonia, or with the desired alkyl or alkanol amine. The sodium salt, for instance, is represented by the following formula:

(8) 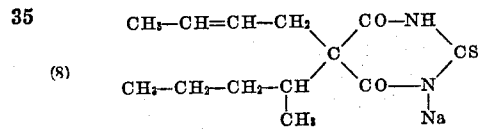

The other alkali-metal salts have the same general formula, save for the substitution of the other metal for sodium. These salts are prepared in the general way of preparing alkali-metal salts from barbituric acids or thio-barbituric acids. The sodium salt is a whitish solid, with a slight yellow tinge, is soluble in water and alcohol, and is insoluble in ether. It is bitter-tasting, and its aqueous solution is alkaline in reaction.

When this sodium salt is desired in stable form sufficiently free from contaminants so that clear water solutions thereof suitable for intravenous injection may be obtained, it is produced by the method set forth in the Shonle Patent No. 1,856,-792, granted May 3, 1932.

The ammonium and alkyl-amine and alkanol-amine salts of crotyl 1-methyl-butyl thiobarbituric acid may be produced by the reaction of that acid with ammonia or with the desired amine, in the usual manner of producing ammonium or alkyl-amine or alkanol-amine barbiturates and thiobarbiturates. The formula of this corresponds in general to formula 1 above, save that $NH_4$ or the proper substituted-ammonium radical is substituted for H at the point X of formula 1.

We claim as our invention:

1. A crotyl 1-methyl-butyl thiobarbituric compound which is represented by the following formula:

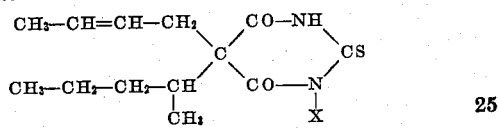

in which X represents a member of the class consisting of hydrogen, an alkali-metal, an equivalent of an alkaline-earth metal, ammonium, mono - alkyl ammonium, di - alkyl ammonium and alkanol ammonium.

2. A crotyl 1-methyl-butyl thiobarbituric acid, which is represented by the following formula:

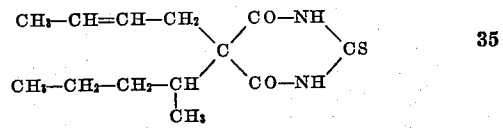

3. Sodium crotyl 1-methyl-butyl thiobarbiturate, which is represented by the following formula:

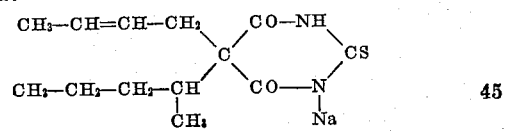

HORACE A. SHONLE.
WILBUR J. DORAN.